(12) United States Patent
Mcvey

(10) Patent No.: US 6,474,602 B1
(45) Date of Patent: Nov. 5, 2002

(54) SPACECRAFT POINTING PERFORMANCE VIA OPTIMIZED SOLAR ARRAY ORIENTATION

(75) Inventor: Ray E. Mcvey, El Segundo, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/559,602

(22) Filed: Apr. 27, 2000

(51) Int. Cl.[7] ................................. B64G 1/44

(52) U.S. Cl. ...................... 244/173; 244/164

(58) Field of Search ................... 244/164, 173, 244/167, 168

(56) References Cited

U.S. PATENT DOCUMENTS 4,728,061 A * 3/1988 Johnson et al. ............. 244/164

* cited by examiner

Primary Examiner—Peter M. Poon
Assistant Examiner—George L. Steele

(57) ABSTRACT

An improved satellite system that limits or eliminates the dynamical rotational response of a satellite body to solar array asymmetrical and symmetrical flexing. The improvement is made by rotating one of a pair of solar arrays to an angle relative to the other solar array along a satellite pitch axis. The solar arrays are then rotated to a position wherein a maximum surface area of solar panels located on the pair of solar arrays is exposed to direct sunlight. The improvement enhances the ability of the satellite to maintain high precision angular stability under operational disturbances without costly and complex structural stiffening solutions.

10 Claims, 3 Drawing Sheets

SPACECRAFT POINTING PERFORMANCE VIA OPTIMIZED SOLAR ARRAY ORIENTATION

This invention was made with Government support under Contract No. F33657-95-C-5052 awarded by the Department of The Air Force. The Government has certain rights in this invention.

TECHNICAL FIELD

The present invention relates generally to satellites, and more particularly, to an improved solar array orientation for satellite systems.

BACKGROUND

Historically, satellite systems use solar arrays (wings) deployed from the body of a satellite in order to power the satellite for normal operations. The solar arrays contain solar panels that receive sunlight and convert the sunlight to solar energy by known methods. The solar energy is then used to power the various components of the satellite.

Each solar array of the satellite is deployed on opposite sides of the main satellite and is oriented in a way that it is substantially coplanar with respect to the other array.

Satellite systems having solar arrays deployed as described above experience symmetric and asymmetric mode frequency changes as the solar arrays flex in response to operational disturbances. Symmetric mode frequency changes (flexing), when the solar arrays synchronously flex up and down (i.e. both up or both down at the same time), cause the body of the satellite to dynamically move up and down in response to the array flexure. This movement typically has little effect on the performance of the satellite.

Asymmetric mode frequency changes (flexing), when one solar array flexes upward and the other flexes downward (or asynchronously in the same direction), may add a rotational dynamical response by the satellite body. This rotational dynamic response negatively affects the performance of satellites that require a rotationally fixed reference point relative to some other object. For example, a photogrammetry camera contained within a satellite may need a fixed reference point on the earth or some other celestial body with which to take its photogrammetric measurements, and rotation may result in inaccurate measurements.

To alleviate or remedy the problem of asymmetric mode frequency changes, satellite stability is typically enhanced by resorting to "brute force" structural stiffening designs of the solar arrays. These stiffer solar arrays do not flex as much in response to operational disturbances of the satellite, and thus lessen rotational dynamic response correspondingly required by the satellite body. This structure adds excess weight to the satellite, which increases costs to place a satellite in orbit. Further, research and development costs to add structural integrity to the satellite may be significant. Also, adding structure to the satellite increases the complexity of the satellite, which in turn may increase the risk of malfunctioning or broken equipment in the manufacture or deployment of the solar arrays.

SUMMARY OF THE INVENTION

It is thus an object of the present invention to lessen or eliminate the amount of structural stiffening in solar arrays that is required to limit or eliminate the dynamical rotational response of a satellite body.

The above object is accomplished by clocking (rotating) one solar array relative to the other, thus creating an "X" array configuration as viewed down the pitch axis of the satellite. The pair of solar arrays are then rotated to a position in which the maximum surface area of solar panels contained on the solar arrays receive direct sunlight from the sun.

The advantage of the present invention is the ability to maintain high precision angular stability without resorting to structural stiffening solutions with their associated complexity, risks and development costs.

Other objects and features of the present invention will become apparent when viewed in light of the detailed description of the preferred embodiment when taken in conjunction with the attached drawings and appended claims.

DETAILED DESCRIPTION OF THE PREFERRED EMBODIMENTS

Figure 1:
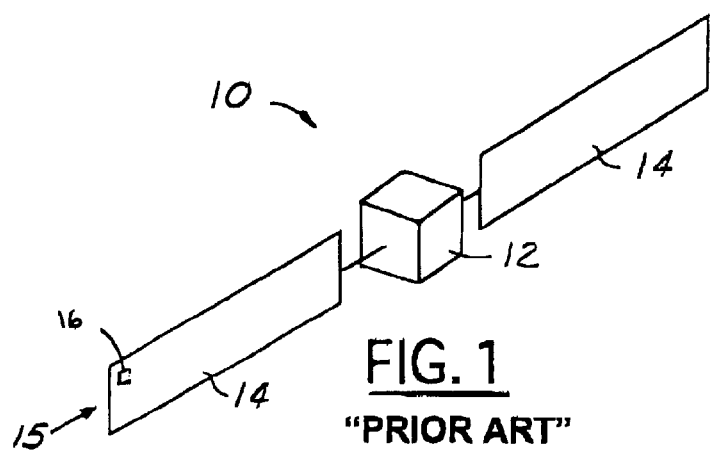
FIG. 1 is a perspective view of a satellite having approximately coplanar solar arrays according to the prior art.
Figure 2:
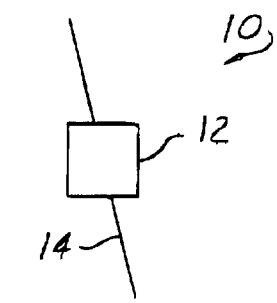
FIG. 2 is a side, view taken along the satellite pitch axis of FIG. 1.

Referring now to FIGS. 1 and 2, a satellite 10 is illustrated having a body portion 12 and a pair of solar arrays 14 oriented according to the prior art. The body portion 12 contains most of the hardware (not shown) used by the satellite 10, including typically transmitters, receivers, and/or photogrammetry equipment. The solar arrays 14 are typically deployed on opposite sides of the body portion 12 and contain solar panels 16 that convert solar energy by known methods to power the various hardware used by the satellite 10. As shown best in FIG. 2, the solar arrays 14 are oriented at all times substantially coplanar with respect to one another about a satellite pitch axis 15. The arrays 14 are rotated continually to ensure that the maximum amount of sunlight is being received by the solar panels 16 as the satellite 10 orbits about the earth (not shown). In addition, the attitude of the satellite 10 relative to a point in space (or on earth) may also be changed to ensure that the maximum amount of sunlight is being received by the solar panels 16.

As described in the background above, the body portion 12 of satellites 10 having this type of solar array 14 configuration experience both translational (up and down movement) and rotational dynamic movement in response to symmetric and asymmetric flexing of the solar arrays 14 caused by operational disturbances in the satellite 10. This rotational movement can negatively affect the performance of various hardware components on the satellite 10 that rely on having a fixed location relative to the earth or other celestial object. To lessen or remedy this rotational problem, the solar arrays 14 are structurally stiffened (not shown) to retard flexure.

Figure 3:
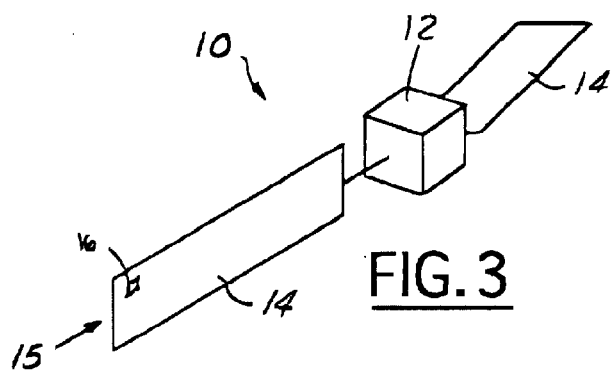
FIG. 3 is a perspective view of a satellite having solar arrays clocked according to the present invention.
Figure 4:
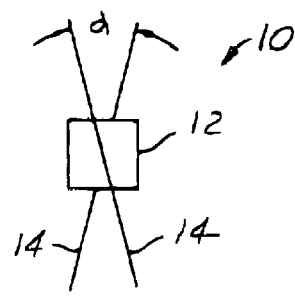
FIG. 4 is a side view taken along the satellite pitch axis of FIG. 3 showing the "X" configuration of the solar arrays.

Referring now to FIGS. 3 and 4, the present invention limits rotational movement of the satellite 10 without adding excess stiffening structure. As shown best in FIG. 4, the solar arrays 14 are rotated to an angle $\alpha$, or first angle, with respect to one another about a satellite pitch axis 15. Increasing the angle $\alpha$ from $\alpha$ to 90 degrees decreases the rotational dynamic response of the body portion 12 without the need for additional structure.

Of course, rotating one solar array 14 with respect to the other has an adverse effect on power in the satellite 10. It is not possible to position the satellite to accumulate as much sunlight on the solar panels 16 as in the coplanar configuration of FIGS. 1 and 2. As such, a balance between rotational stability and power accumulation will have to be determined for each individual satellite 10 based upon the power requirements of the satellite 10. This balance must factor in the flexing ability of the solar arrays 14 and the operational disturbance caused by the hardware components of the satellite 10 itself.

FIGS. 5 through 8 illustrate how the rotation of one solar array relative to the other has an effect on the net power loss as a function of surface area available to direct sunlight, where the angle $\alpha$, or first angle, is varied from 0 degrees to 60 degrees. In the figures, the values −90 to 90 on the x-axis indicate the number of degrees the arrays 14 are rotated away from the sun. Thus, 0 degrees represents when the arrays 14 are pointing directly at the sun, and −90 and 90 indicates when the arrays 14 are rotated 90 degrees away from the sun in opposite directions. The values on the y-axis represents the total normalized surface area of the solar panels 16 that is receiving direct sunlight, with the solar panels 16 of each solar array 14 having a total surface area normalized value of 1, with the total surface area of the solar panels 16 of both solar arrays 14 having a normalized value of 2. Thus, a value of 1.9 would indicate that 1.9 units of surface area on the two solar arrays 14 are receiving sunlight, while 0.1 units are not receiving sunlight, thus the solar panels are producing roughly 95% of the power compared to the maximum normalized value of 2.

Figure 5:
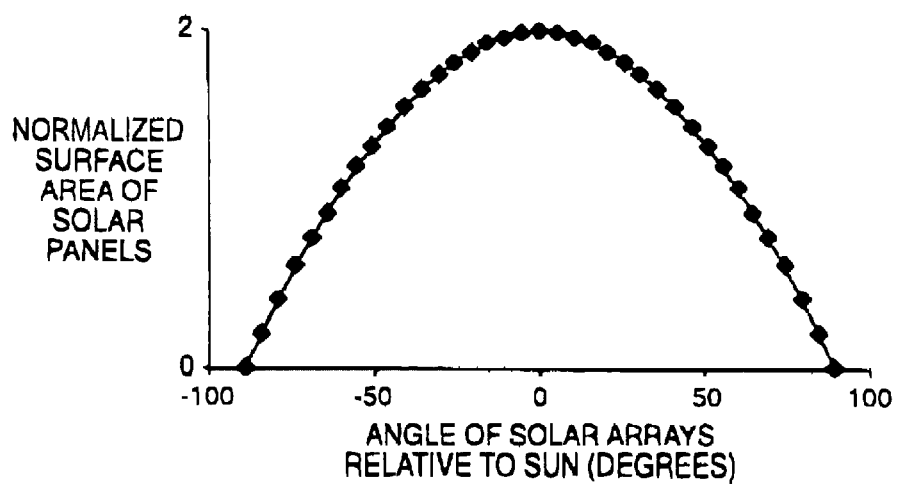
FIG. 5 is a graph illustrating the net surface area loss of the solar panels as a function of the relative angle to sunlight for a solar array having a coplanar arrangement.

Referring to FIG. 5, where the solar arrays are substantially coplanar (corresponding to an angle $\alpha$ equal to 0 degrees), the maximum value of solar panel 16 efficiency is achieved at 0 degrees and is equal to a normalized value of 2. This indicates that every solar panel 16 on both solar arrays 14 is receiving its maximum sunlight. Hence, the power output is maximized at 0 degrees. As the arrays 14 are rotated away from 0 degrees, an increasing portion of the surface area of the solar panels 16 is not receiving direct sunlight, and hence the power output generated by the solar panels 16 is correspondingly decreased. For example, at 60 degrees, roughly 50% of the surface area of the solar panels 16, corresponding to a normalized value of 1.000134, is not receiving direct sunlight. Hence, the solar panels 16 are producing roughly 50% of the power as compared with at 0 degrees.

Figure 6:
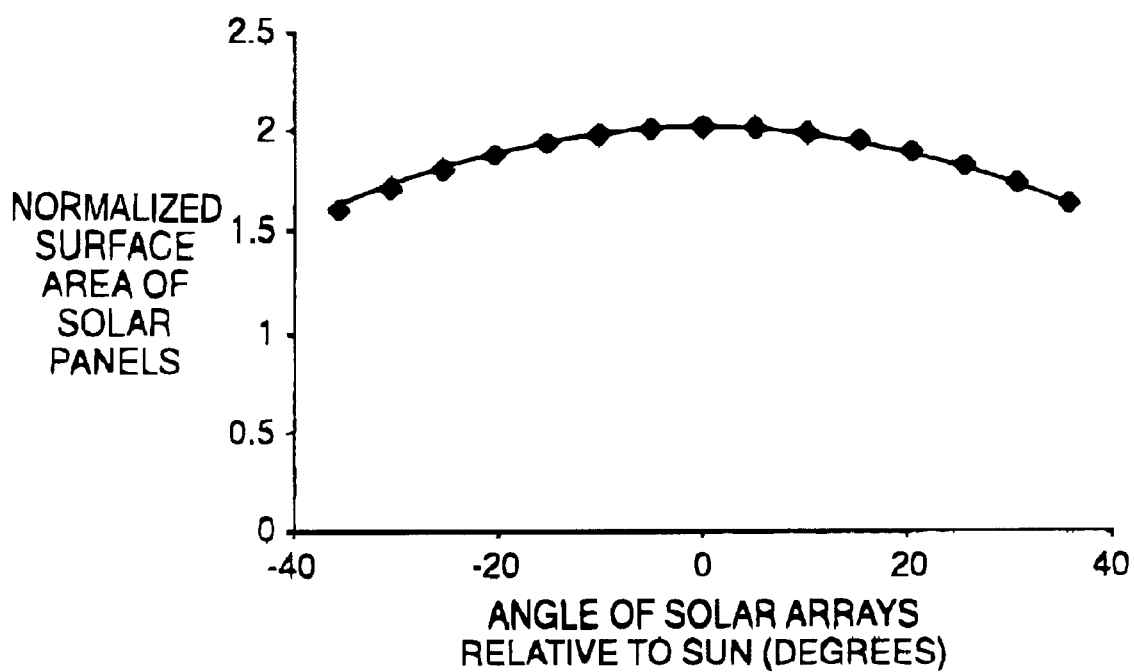
FIG. 6 is a graph illustrating the net surface area loss of the solar panels as a function of the relative angle to sunlight for a solar array having a 20 degree rotation relative to its opposite solar array.
Figure 7:
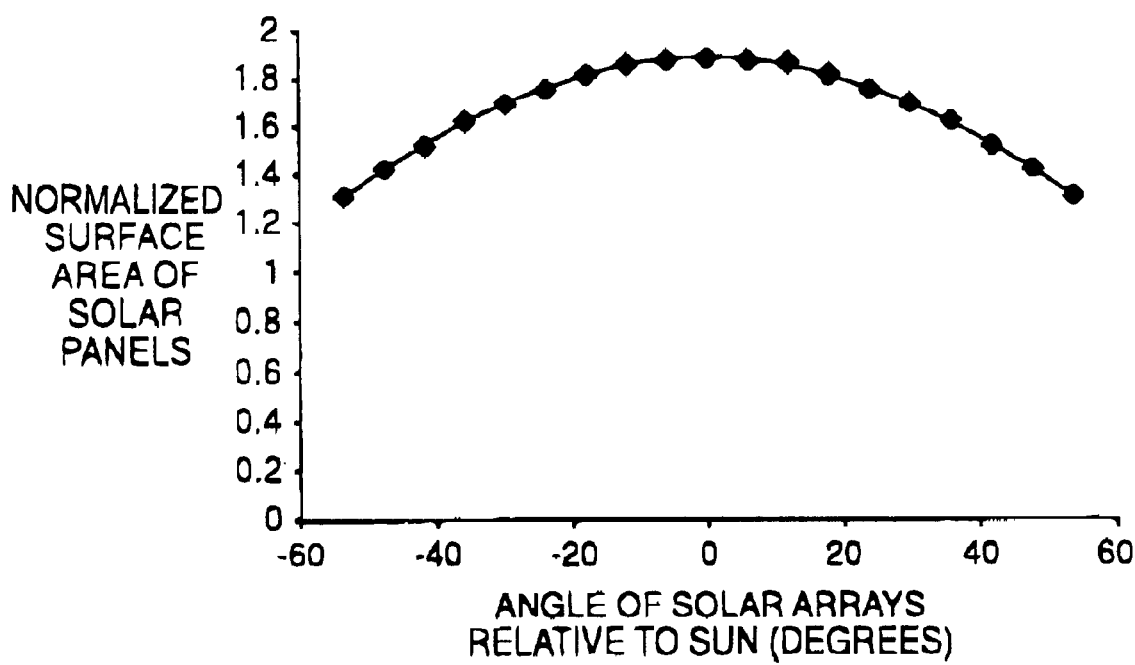
FIG. 7 is a graph illustrating the net surface area loss of the solar panels as a function of the relative angle to sunlight for a solar array having a 40 degree rotation relative to its opposite solar array.
Figure 8:
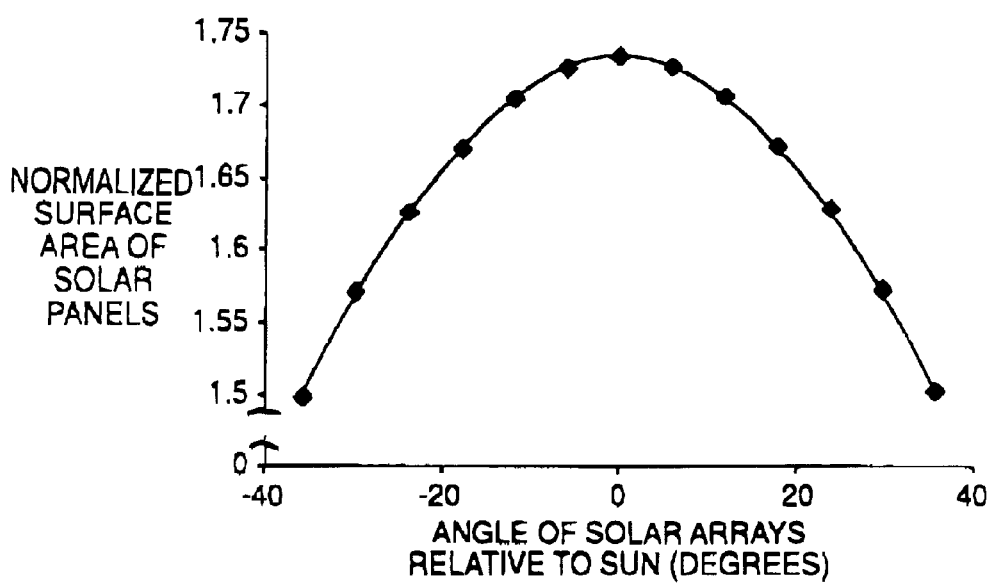
FIG. 8 is a graph illustrating the net surface area loss of the solar panels as a function of the relative angle to sunlight for a solar array having a 60 degree rotation relative to its opposite solar array.

Referring now to FIGS. 6–8, the angle $\alpha$ of the solar arrays 14 is changed relative to each other. In FIG. 6, where the angle $\alpha$ of the solar arrays relative to each other is 20 degrees, the maximum surface area of the solar panels 16 receiving direct sunlight corresponds to approximately −10 degrees of solar array 14 rotation away from the sun, where the normalized value of surface area of the solar panels 16 receiving direct sunlight is equal to 1.969620. This corresponds to a power loss of approximately 1.5%. In FIG. 7, where the angle $\alpha$ of the solar arrays relative to each other is 40 degrees, the maximum surface area of the solar panels 16 receiving direct sunlight corresponds to approximately −20 degrees of solar array 14 rotation away from the sun, where the normalized value of surface area of the solar panels 16 receiving direct sunlight is equal to 1.879403. This corresponds to a power loss of approximately 6.0%. Finally, in FIG. 8, where the angle $\alpha$ of the solar arrays relative to each other is 60 degrees, the maximum surface area of the solar panels 16 receiving direct sunlight corresponds to approximately −30 degrees of solar array rotation away from the sun, where the normalized value of the surface area of the solar panels 16 receiving direct sunlight is equal to 1.732089. This corresponds to a power loss of approximately 13.4%. Of course, while not illustrated, cover glass transmission values and other secondary effects at higher incidence angles may also be factored in.

Collectively, FIGS. 5 through 8 illustrate that increasing the angle $\alpha$ of the solar arrays relative to each other decreases the maximum solar panel 16 efficiency. Further, FIGS. 5 through 8 illustrate that the solar arrays 14 must be rotated relative the sun in order to achieve maximum power output for each potential clocked position that can be adjusted as a satellite 10 orbits around an object. This rotation is accomplished while maintaining the relative clocking angle $\alpha$ between the pair of solar arrays 14. The present invention is especially useful in systems where adjusting the attitude of the satellite 10 is not an option, as this could affect the hardware equipment that relies upon the relative position of the equipment relative to some object, such as photogrammetry equipment.

Thus, the present invention provides a robust way of determining the individual characteristics of a satellite 10. For example, if a satellite 10 requires maximum rotation control and little power output, the solar arrays 14 may have a higher angle $\alpha$ relative to each other and must collectively be rotated to a position to receive the maximum sunlight. If a satellite 10 requires less rotation control and more power output, the solar arrays 14 may have a lower angle $\alpha$ relative to each other and less collective rotation away from the sun. Preferably, in the satellite 10 applications contemplated by the present invention, the solar arrays 14 will have an angle $\alpha$ between 15 and 75 degrees to decrease the amount of rotational dynamic response required by the satellite body 12. Also, of course, it is contemplated that some structural stiffening could be added if the power output and angle $\alpha$ required for a particular application could not be achieved alone.

While particular embodiments of the invention have been shown, it will be understood, of course, that the invention is not limited thereto since modifications may be made by those skilled in the art, particularly in light of the foregoing teachings. For instance, this invention is applicable to any body stabilized spacecraft with solar arrays. It is, therefore, contemplated by the appended claims to cover any such modifications as incorporate those features that constitute the essential features of these improvements within the true spirit and the scope of the invention.

What is claimed is:
1. A satellite comprising:
   a satellite body; and a first and a second solar array deployed from opposite sides of said satellite body, said first solar array and said second solar array having a first angle therebetween relative to a satellite pitch axis, wherein said first angle is set to minimize the dynamic rotational response of the satellite in response to assymmetrical flexing of said first and said second solar array.

2. The satellite of claim 1, wherein said first angle is also a function of solar power loss.

3. The satellite of claim 1, wherein said first angle is greater than 0 degrees and less than or equal to 90 degrees therebetween relative to said satellite pitch axis.

4. The satellite of claim 1, wherein said first angle is greater than 15 degrees and less than 75 degrees relative to said satellite pitch axis.

5. A method of decreasing dynamic rotation in a satellite in response to asymmetrical flexing of solar arrays in the satellite, where each solar array has a plurality of solar panels, the method comprising the step of:

deploying a first solar array and a second solar array from opposite sides of a satellite body, said first solar array and said second solar array having a first angle therebetween relative to a satellite pitch axis.

6. The method of claim 5, wherein the step of deploying a first solar array and a second solar array from opposite sides of a satellite body, said first solar array and said second solar array having a first angle therebetween relative to a satellite pitch axis comprises the step of deploying a first solar array and a second solar array from opposite sides of a satellite body, said first solar array and said second solar array having a first angle greater than 0 degrees and less than or equal to 90 degrees therebetween relative to a satellite pitch axis.

7. The method of claim 5, wherein the step of deploying a first solar array and a second solar array from opposite sides of a satellite body, said first solar array and said second solar array having a first angle therebetween relative to a satellite pitch axis comprises the step of deploying a first solar array and a second solar array from opposite sides of a satellite body, said first solar array and said second solar array having a first angle therebetween relative to a satellite pitch axis, wherein said first angle is also a function of an acceptable solar panel efficiency.

8. The method according to claim 5 further comprising the step of maximizing the solar panel efficiency of the plurality of solar panels corresponding to said first angle.

9. The method of claim 8, wherein the step of maximizing the solar panel efficiency of the plurality of solar panels corresponding to said first angle comprises the step of rotating said first solar array and said second solar array to a first position relative to the sun while maintaining said first angle therebetween, wherein said first position corresponds to a maximum total surface area of the plurality of solar panels located on said first solar array and said second solar array receiving direct sunlight corresponding to said first angle.

10. The method of claim 9, wherein the step of rotating said first solar array and said second solar array to a first position relative to the sun while maintaining said first angle therebetween comprises the step of rotating said first solar array and said second solar array between −90 and 90 degrees relative to the sun to a first position while maintaining said first angle therebetween.

* * * * *